(12) United States Patent
Escuriola Ettingshausen et al.

(10) Patent No.: US 9,092,031 B2
(45) Date of Patent: Jul. 28, 2015

(54) METHOD FOR OPERATING A SYSTEM, AND DRIVER-LESS TRANSPORT SYSTEM

(71) Applicant: SEW-EURODRIVE GMBH & CO. KG, Bruchsal (DE)

(72) Inventors: Manuel Escuriola Ettingshausen, Eltville (DE); Stephan Nicklis, Ober-Ramstadt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/288,001

(22) Filed: May 27, 2014

(65) Prior Publication Data

US 2014/0350770 A1 Nov. 27, 2014

Related U.S. Application Data

(62) Division of application No. 11/884,338, filed as application No. PCT/EP2006/000491 on Jan. 20, 2006, now abandoned.

(30) Foreign Application Priority Data

Feb. 12, 2005 (DE) .......................... 10 2005 006 554

(51) Int. Cl.
*G05D 1/00* (2006.01)
*G05D 1/02* (2006.01)

(52) U.S. Cl.
CPC ............ *G05D 1/0088* (2013.01); *G05D 1/0282* (2013.01)

(58) Field of Classification Search
CPC .......................... G05D 1/0088; G05D 1/0282
USPC ............... 701/23, 25, 50, 430, 460, 410, 469; 901/901; 700/253, 245
See application file for complete search history.

(56) References Cited

U.S. PATENT DOCUMENTS

| | | | |
|---|---|---|---|
| 4,063,699 | A | 12/1977 | Wallgard |
| 4,940,925 | A | 7/1990 | Wand et al. |
| 5,179,329 | A | 1/1993 | Nishikawa et al. |
| 5,615,116 | A * | 3/1997 | Gudat et al. ................. 701/23 |
| 7,191,060 | B2 | 3/2007 | Makela |

(Continued)

FOREIGN PATENT DOCUMENTS

| | | |
|---|---|---|
| DE | 1 902 805 | 8/1970 |
| DE | 87 01 759 | 7/1987 |
| DE | 40 13 168 | 10/1990 |

(Continued)

OTHER PUBLICATIONS

International Search Report, dated Feb. 5, 2006, issued in corresponding International Application No. PCT/EP2006/000491.

(Continued)

*Primary Examiner* — Marthe Marc-Coleman
(74) *Attorney, Agent, or Firm* — Kenyon & Kenyon LLP

(57) ABSTRACT

In a method for operating a system, the system includes at least one path, which includes path sections. Vehicles are able to travel along the path, and an electronic circuit is included for controlling at least the speed of the vehicle. Codes are situated along the path, and the vehicle includes at least one sensor, e.g., for detecting the codes, which is connected to the electronic circuit. A data exchange is implementable between one vehicle or a plurality of vehicles and at least one stationary unit.

8 Claims, 7 Drawing Sheets

(56) References Cited

U.S. PATENT DOCUMENTS

| | | | |
|---|---|---|---|
| 7,603,235 | B2 | 10/2009 | Makela et al. |
| 2004/0158366 | A1 | 8/2004 | Dieterle |

FOREIGN PATENT DOCUMENTS

| | | |
|---|---|---|
| DE | 691 04 604 | 5/1995 |
| DE | 102 10 546 | 9/2003 |
| WO | 91/12571 | 8/1991 |
| WO | 2004/085965 | 10/2004 |

OTHER PUBLICATIONS

English Translation of International Preliminary Report on Patentability, dated Sep. 20, 2007, issued in corresponding International Application No. PCT/EP2006/000491.

* cited by examiner

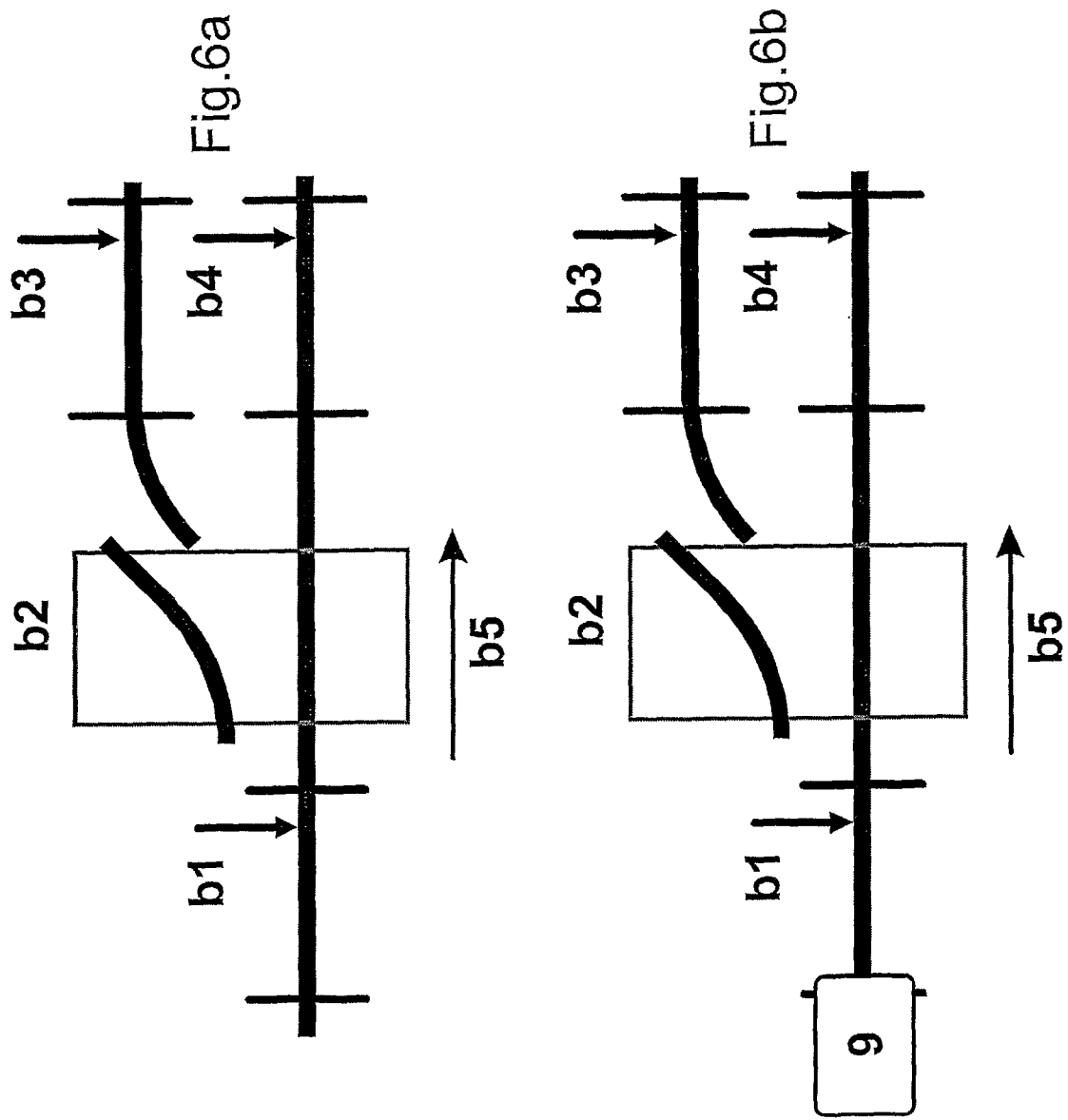

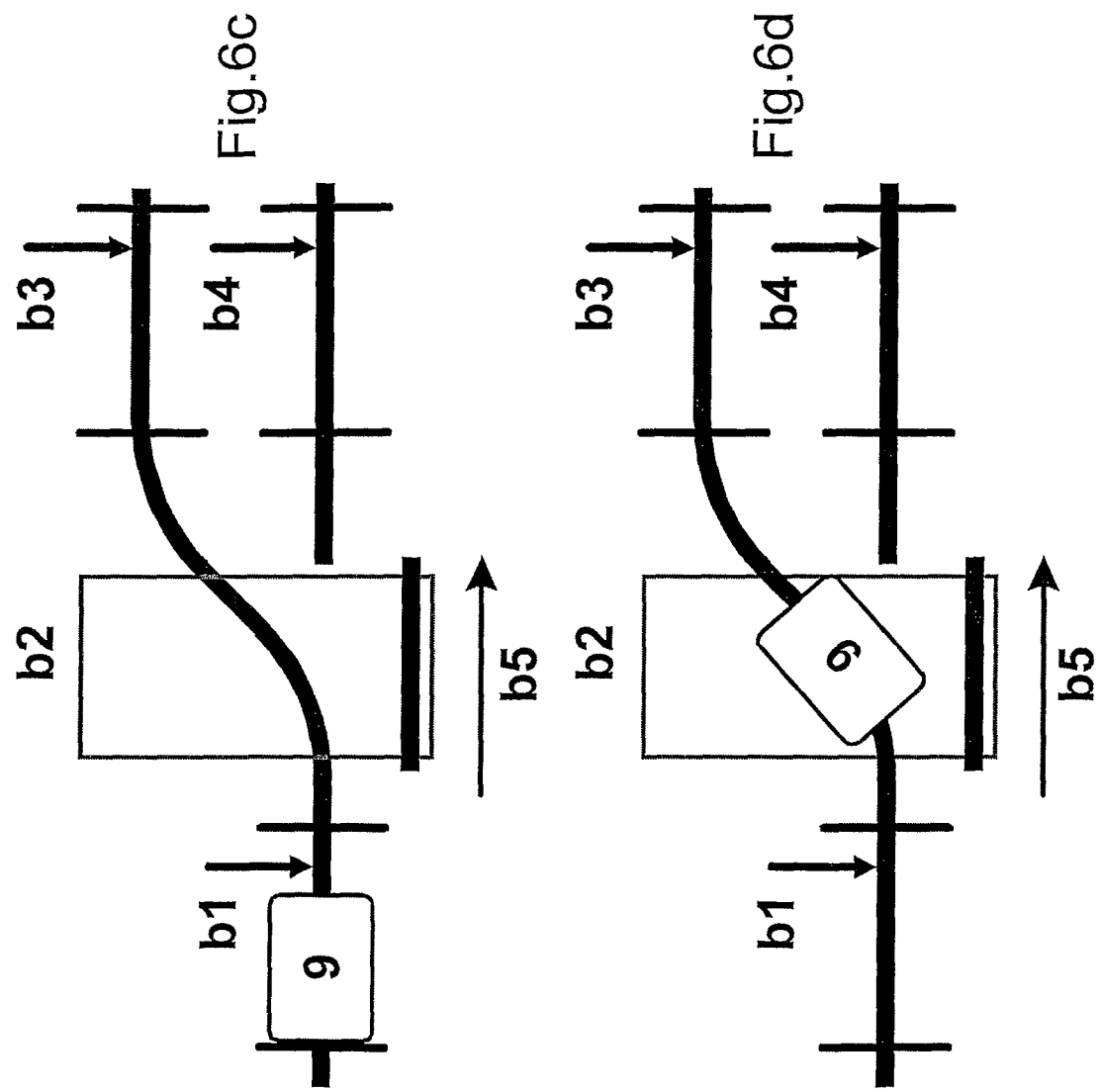

METHOD FOR OPERATING A SYSTEM, AND DRIVER-LESS TRANSPORT SYSTEM

CROSS-REFERENCE TO RELATED APPLICATION

This application is a divisional of U.S. patent application Ser. No. 11/884,338 filed on Aug. 13, 2007, which is a national phase of International Application No. PCT/EP2006/000491 filed on Jan. 20, 2006, which claims priority to German Patent Application No. 10 2005 006 554.6 filed on Feb. 12, 2005, each of which is expressly incorporated herein in its entirety by reference thereto.

FIELD OF THE INVENTION

The present invention relates to a method for operating a system, and to a driver-less transport system. Counted among these are also rail-bound or railless systems. Mobile assembly platforms are among them as well.

SUMMARY

Example embodiments of the present invention provide for reducing the expense and complexity of a system, e.g., the technical outlay with regard to the development, setup as well as the operation, and also the financial cost by increasing the service life.

In a method according to an example embodiment of the present invention, a system includes at least one path, which is made up of path sections, vehicles are able to travel on the path, and an electronic circuit is included for controlling at least the speed of the vehicle, codes are situated along the path, the vehicle including at least one sensor, e.g., for detecting the codes, which is connected to the electronic circuit, a data exchange is implementable between one vehicle or a plurality of vehicles and at least one stationary unit, the method including:

a table is loaded into the electronic circuit of the vehicle at least during initial operation;
the following steps are repeated at time intervals:
i) the information concerning the codes is detected and forwarded to the electronic circuit of the vehicle;
ii) using the table, the particular path section in which the vehicle is located is determined with the aid of the detected information;
iii) a message from a stationary unit is received, the message including message portions that are assigned to particular path sections;
iv) the message portion that is assigned to the particular path section is utilized, and the instructions included therein are executed;
v) the particular message portion that is assigned to an adjacent path section, e.g., the path section that is to be reached next according to an advance calculation, is stored;
vi) the information concerning the codes is detected repeatedly and forwarded to the electronic circuit of the vehicle;
vii) using the table, the particular path section in which the vehicle is located is determined with the aid of the detected information;
viii) if the adjacent path section has been reached, the information, such as instructions, assigned to the new path section is implemented;
ix) points iii) through ix) are repeated multiple times.

Upon initial operation, the vehicle may receive for storing information such that, having knowledge of its path section in which it is located, it is able to extract the portions of the message sent to all, and implement the portions intended for the particular path section. The simplicity of the method is also to be seen in that the message is always sent to all vehicles, and the path controller may, but need not, take the position at which the vehicle is located into account.

Sensors along the path may be able to be dispensed with since the vehicle is detecting the position on its own.

The transmission of energy and/or information may reduce the complexity by the implementation of a contactless transmission. This also extends the operating time, i.e., the service life, since no wear components are required.

According to example embodiments of the present invention:

i) sequences (P1, P2, P3, . . . PN) are stored in a memory of the electronic circuit at least upon initial operation, each sequence being controllable by the electronic control by influencing the speed of the vehicle as a function of the input signals from the sensors of the vehicle, e.g., without a data exchange with the stationary unit;
the stationary unit sends out information that assigns one of the sequences (P1, P2, P3, . . . PN) to each path section, so that it is activated in this path section.

There may be no need to transmit software associated with the sequences during operation of the system. Instead, only the assignment information may need to be transmitted, in the form of parameters, for example. This saves time and thereby allows the implementation of applications that are critical as to time.

It is possible to transmit more information per second. The vehicles may have a memory of sufficient size so that the software in connection with all possible aforementioned sequences is able to be loaded into the memory upon initial operation. In contrast, only one parameter, which includes the activation or deactivation of the sequence to be executed in each case, is left to be transmitted during operation. As a consequence, only a small data stream is required, and therefore a rapid repeat rate of the information transmission.

The data exchange between the vehicles and the stationary unit may be at least partially implemented in a contactless manner. No components may be required that are subject to wear.

The vehicles may also exchange data among themselves. This may provide that collisions of the vehicles are able to be avoided.

The vehicles may be supplied with energy and information in a contactless manner. This may provide that no components are required that are subject to wear, and the same primary conductor is able to be utilized for the supply with energy as well as information modulated upon at a higher frequency.

The stationary unit may have a path controller, which is able to be supplied with data from a database of a computer network, the computer network having a display device which make it possible to display the state of the system or the essential state information. This may provide for allowing a well-structured, i.e., rapidly and easily comprehensible, visualization, which makes it possible to influence the operating method of the entire system.

Example embodiments of the present invention may be provided in connection with an electric suspended conveyor having a multitude of vehicles or in an automated guided transport system if the vehicles are supplied with energy and information in a contactless manner. This may produce less friction and thus also less wear, and it is possible to increase the operating time and/or the speed of the vehicles. But even at these higher speeds and the related shorter response times, example embodiments of the present invention make it possible for the system to function.

LIST OF REFERENCE CHARACTERS 1 path designer
2 database
3 path controller
4 decentralized unit
5 decentralized unit without path controller
6 router
7 SPS
8 computer network
9 vehicles with rail
10 switch
a: path
b: path region
c: vehicle
d: message
e: message portion for a path region
f: response of the vehicle for a path region
g: path controller

BRIEF DESCRIPTION OF THE DRAWINGS

FIGS. 6a to 6d show an example of a system according to an example embodiment of the present invention.

DETAILED DESCRIPTION

Example embodiments of the present invention are described in greater detail below with reference to the appended Figures.

The system includes a path a, such as a rail system, this path a being made up of path regions b.

Vehicles (c, 9) are able to travel on path a. They are provided with drives having an electronic control system. In different exemplary embodiments, it is possible for the drive to be regulated with the aid of the electronic control system, or also to be switched on and off only, i.e., be controllable. The electronic control system exchanges data with a stationary, decentralized unit (4, 5), which is connected to additional computers such as an SPS, a computer network 8, etc., for the purpose of exchanging data. Each data exchange is implemented in a contactless manner or via electrical lines. The contactless transmission from the stationary to the movable component, i.e., the vehicle(s), may be considered advantageous since only little interference occurs. A contactless transmission is provided via electromagnetic waves, e.g., in the MHz or GHz range. In one variant, a slotted coaxial conductor is installable along the path, the vehicle guiding an antenna along the region of the slot, i.e., in the nearfield. In another variant, it is also possible to fill the space with radio waves, i.e., to utilize the farfield, the vehicle having a correspondingly configured antenna in this case. In another exemplary embodiment, the vehicle is to be electrically supplied from an extended primary conductor in an inductive manner, via a secondary coil; in addition, the information is modulated upon at a higher frequency.

Figure 1:
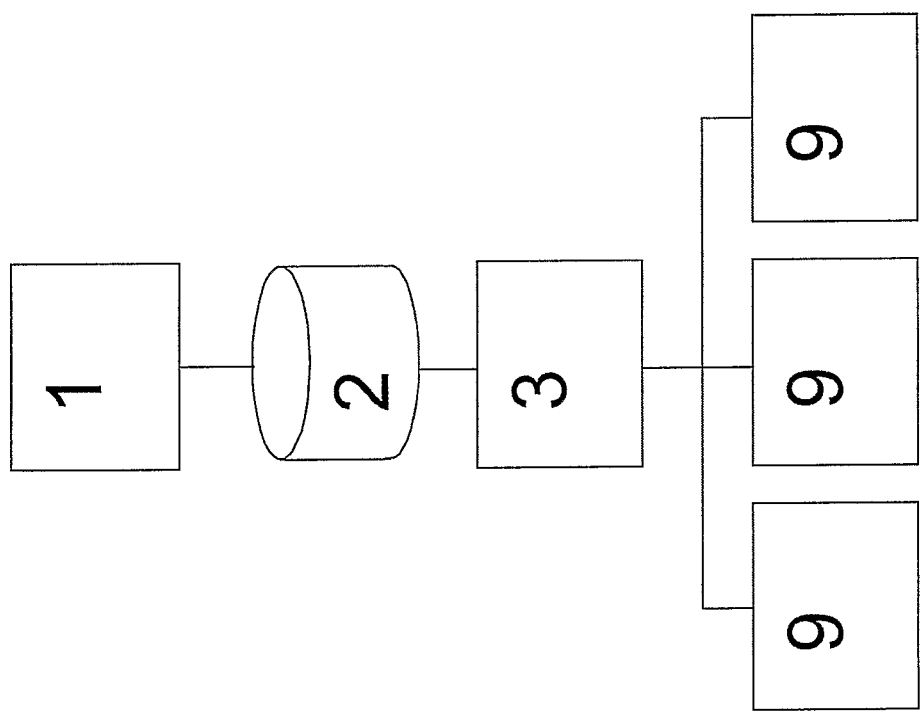
FIG. 1 shows an example of a system according to an example embodiment of the present invention.
Figure 3:
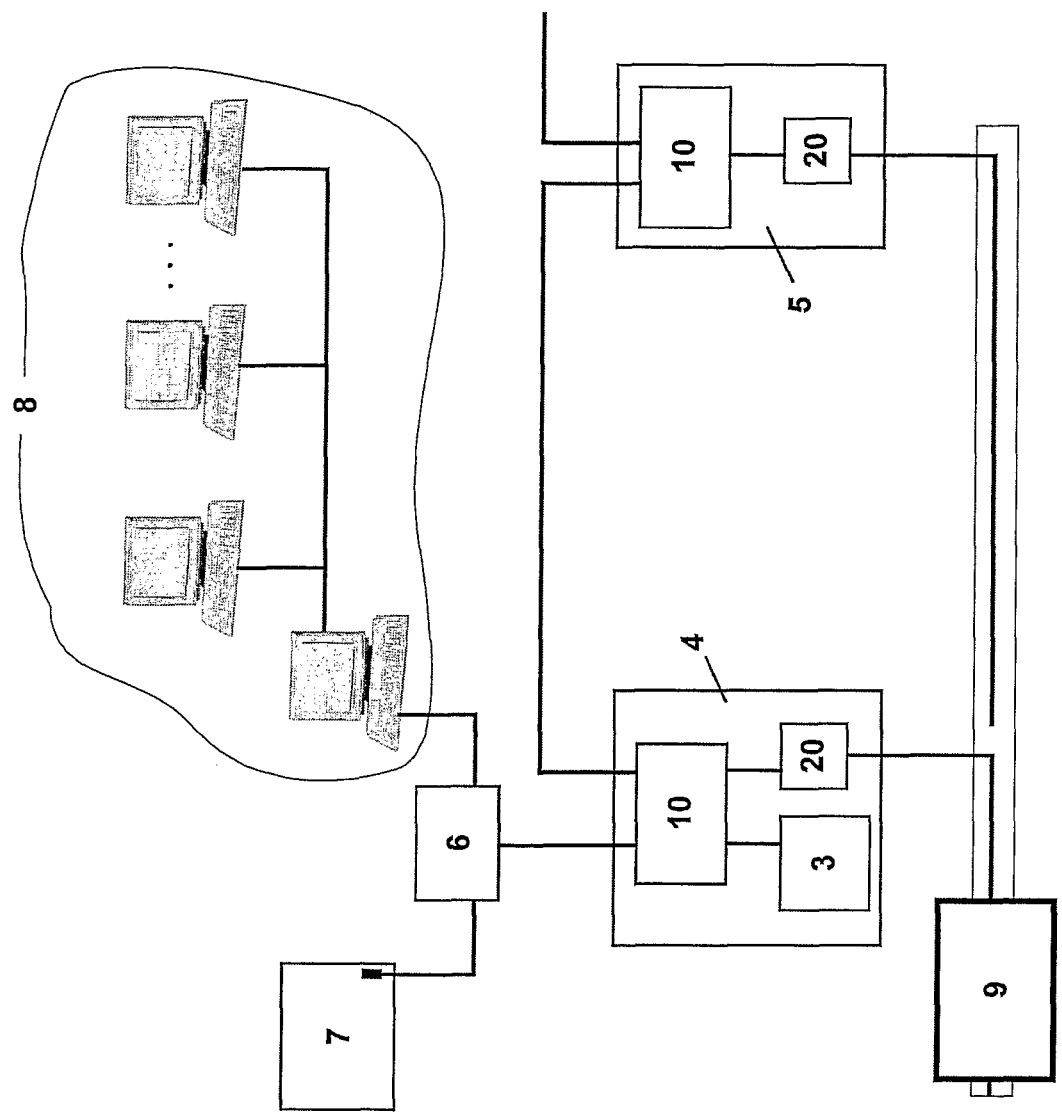
FIG. 3 shows an example of a system according to an example embodiment of the present invention.

The described system is illustrated in FIG. 3. References is also made to FIG. 1. Physical path a with its path sections b is mapped in computer network 8, and each path section is assigned its function. One path section b, for instance, is a straight piece or, as an alternative, a section having a switch. A program, which is also referred to as path designer 1 in the following text, is used for this purpose on one of the computers of computer network 8. It is connected to a database 2. The supply of one path controller 3 or a plurality of path controllers 3, which is/are part of decentralized unit 4, is implemented from there. Furthermore, an SPS may optionally be connected to this decentralized unit. A switch 10, an access point 20 or a router 6 may also be interconnected. The SPS is not essential, however, and may also be omitted. It may be required only for peripheral units or functions.

That is to say, a path designer 1, a database 2, a path controller 3, one vehicle or a plurality of vehicles 9 are provided. The path topology and additional data are graphically input into path designer 1, which stores this information in the database. Based on these data, path controller 3 is able to coordinate path a and thus the vehicles (9, c) located on path a.

In other exemplary embodiments of the present invention, path controller 3 is able to be equipped with a display device, such as a graphics display using touch, touch screen, etc. This allows a diagnosis and manual operation.

In additional exemplary embodiments, path controller 3 is electronically connected to these combined display and input device(s) such that a diagnosis and manual operation are able to be executed remotely.

FIG. 3 also shows a decentralized unit 5 without a path controller, which supplies a different path section b than decentralized unit 4 having path controller 3. Instead, path controller 3 is configured so as to be able to supply decentralized unit 5 with information as well. In this exemplary embodiment, path controller 3 is therefore arranged to supply two path sections.

Figure 2:
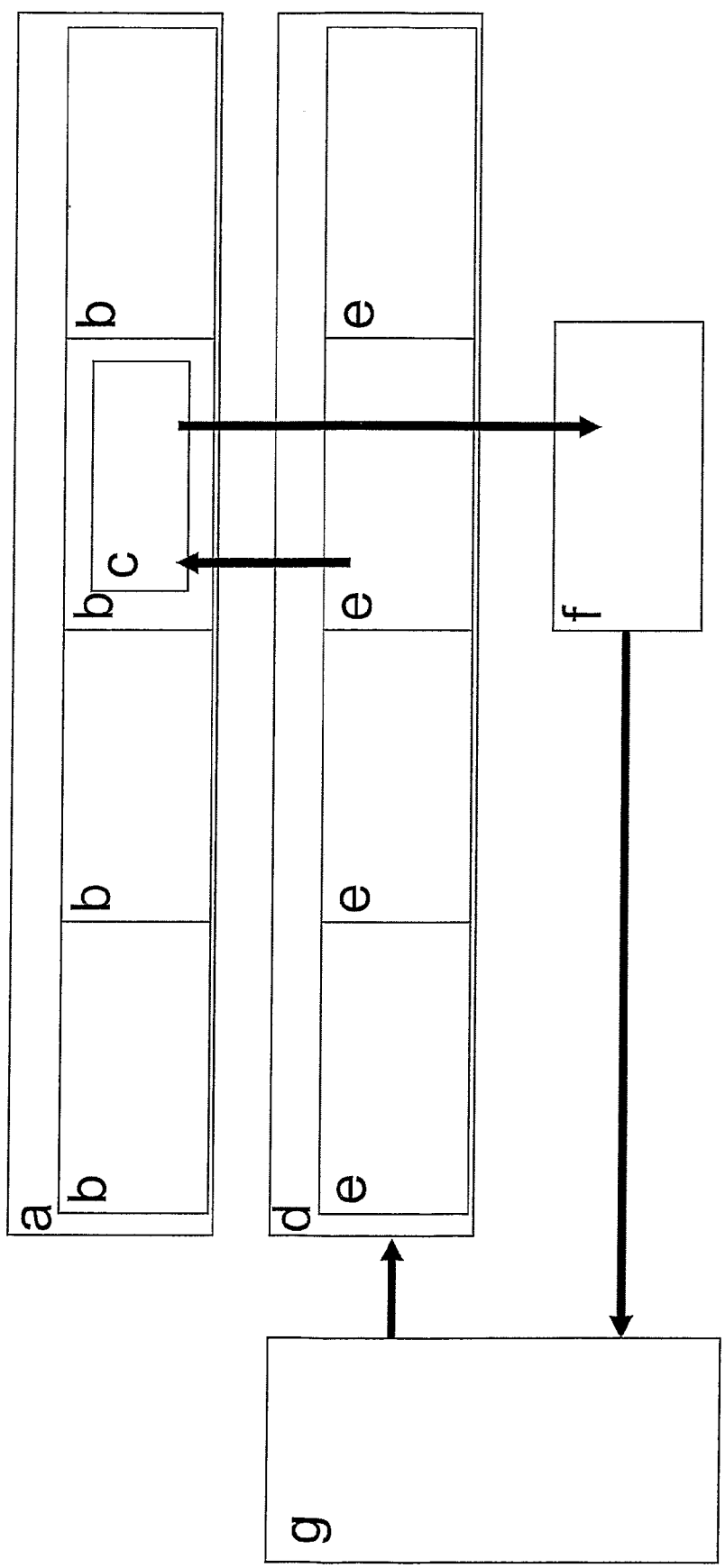
FIG. 2 shows an example of a system according to an example embodiment of the present invention.

The configuration and method of functioning of the data telegrams is illustrated in FIG. 2. Vehicle c is located in one of path sections b of path a. At time intervals, path controller g transmits a message, i.e., a data telegram, message d including message portions e, which include information meant for a particular path section in each case. The messages are transmitted regularly or as the need arises.

The vehicle is provided with a sensor, which reads an identification, i.e., a code, situated along the path, and thereby records an item of position information. Upon initial operation, the vehicle receives from the path controller a table with whose aid it is able to identify the path section associated with the item of position information.

That is to say, the vehicle receives entire message d and extracts the particular message component e that is intended for the path section in which the vehicle happens to be located. The vehicle implements the included information items, such as instructions, etc. Driving up to a position is one example. The vehicle is able to return data telegrams f to the path controller, as a response, for instance. Status information such as the position and/or the speed are transmitted in the process.

That is to say, all vehicles receive the message of the path controller, and every vehicle filters out only the information meant for itself as a function of the path section in which it is located.

The path controller also checks the received data in a logical manner and uses the attained status and the further items of information to generate the next data telegram, which it transmits.

The vehicles are not served by an SPS individually, i.e., send their status and the SPS only then transmitting an instruction for the vehicle, but the vehicle also receives instructions that are meant for another path section. The vehicle is able to store the information for the next adjacent section and implement this information upon reaching next path section b. Example embodiments of the present invention therefore allow a path-focused communication that is not critical with respect to time. The vehicle simply executes the most recently received information for the next section.

In exemplary embodiments, it is also possible for a plurality of vehicles c to be located in a path region b, provided they communicate with one another. In the case of especially large paths, one or a plurality of path controller(s) may also send a plurality of telegrams. If required, they may be sealed off from each other, so that vehicles receive only the telegrams that are relevant to the own region.

Example embodiments of the present invention may be used for electric suspended conveyors, driverless transport systems (FTS, BTS, etc.), push skid systems, similar systems, etc.

Figure 4:
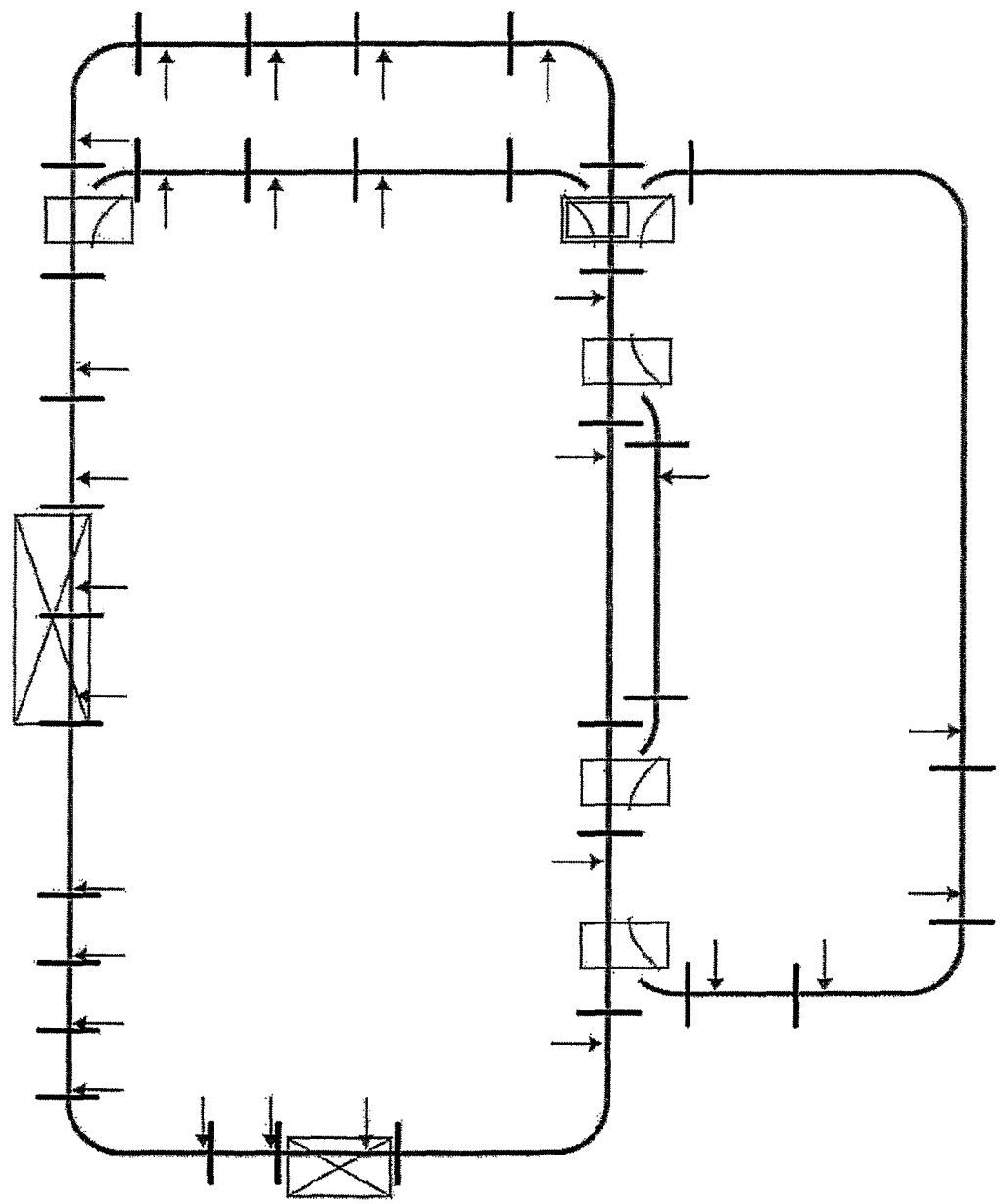
FIG. 4 shows an example of a system according to an example embodiment of the present invention.

FIG. 4 shows an example of a system according to an example embodiment of the present invention, in which path sections b are separated by solid lines, each of which is oriented perpendicular to the path. The arrows indicate a stopping position where the vehicle is to stop if it did not receive any pass-information.

The vehicle has a memory, which includes sequences P1, P2, P3, etc. Each sequence corresponds to a method of operation for different types of path sections. For instance, there is a straight section or a path section having a switch. Which sequence is to be activated for which particular path section is determined by the message sent by the path controller. As a result, one sequence, i.e., an unambiguous functional sequence, is assigned to each path section at all times.

Figure 5:
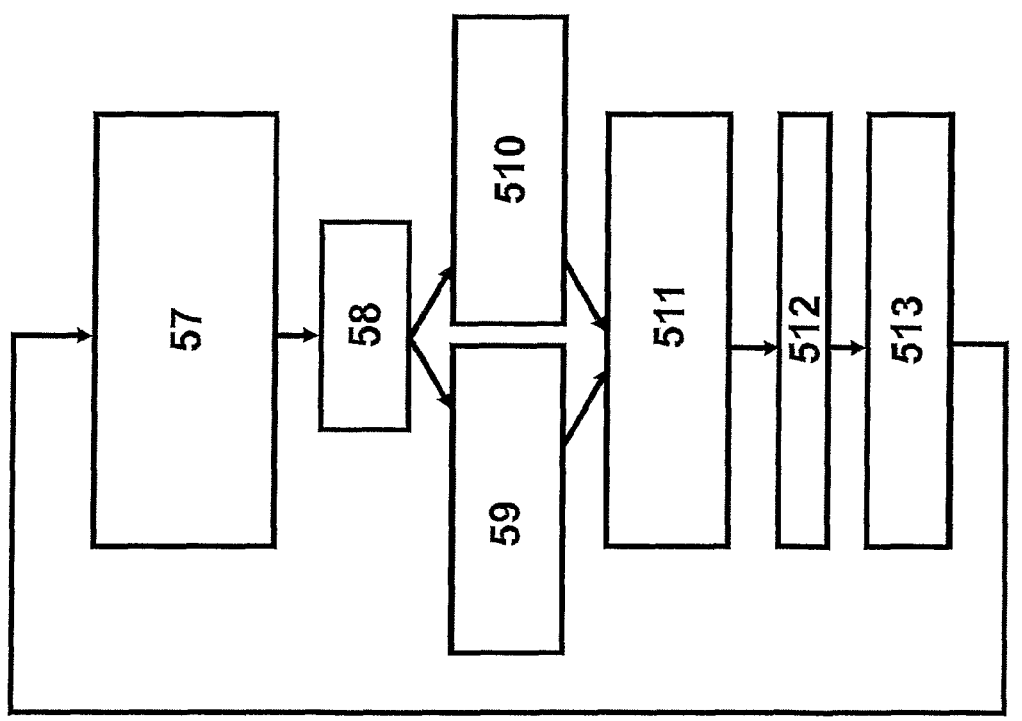
FIG. 5 shows an example of a system according to an example embodiment of the present invention.

FIG. 5, by way of example, shows the functional sequence for a path section with a switch, which is illustrated in FIG. 6a. Path section b1 includes a position that has been marked by an arrow. Path section b2 includes a switch. Path section b3 and b4 each include a straight section. A vehicle 9 entering in front of path section b1 is illustrated in FIG. 6b. Under item 57, the instruction "drive up to position" is executed, as illustrated in FIG. 6c. At the very latest when the vehicle has reached the position will the configuration be checked under item 58. If it is possible to query the switch position from a local database, this will be done under item 59. If the switch position is able to be queried from a superposed database, this will take place under item 510. The switch is set under item 511, and a wait takes place until an item of information that includes the OK feedback of the switch has been received. Under item 512, the "pass through" instruction will be executed, as illustrated in FIG. 6d. Given sufficient size of the system, it is possible for the vehicle to pass through without stopping, since the instruction for passing through the switch is transmitted faster than the vehicle is able to reach the stopping position marked by the arrow. A wait then takes place under item 513 until the vehicle has left the path section.

In exemplary embodiments, it is possible that at least two of the sequences (P1, P2, P3, ... PN) are assigned to one type of path sections in each case and that they differ only in the instructions, i.e., commands, to be implemented in this type of path section. Upon initial startup, it is storable in the vehicle which particular subset of sequences is assigned to which path section, each of these sequences of the subset relating to the same type of path, for instance, a section having a switch. The difference between the sequences within the subset consists only of the type of commands to be executed. Items of information that select this command are transmitted to the vehicle during operation by the stationary unit. The sequence of the subset that applies at any given time is therefore able to be adapted in a flexible manner during the operation. In contrast, the path type is fixedly stored.

It is also possible that the sequences (P1, P2, P3, ..., PN) are assigned to one type of path sections, and differ only by the instructions, i.e., commands to be executed in this type of path section, the command being activated or deactivated as a function of the received message portion.

An example for a type of path section is a section that includes at least one switch. Another example is a section that includes a stopping position.

Paths and path sections may be utilized for rail-bound or railless systems, thus, e.g., for transport systems that require no driver, i.e., automated guided transport systems. Examples are an electric suspended conveyor, push skid system or other mobile assembly platforms.

What is claimed is:

1. A method for operating a system, the system including at least one path having path sections, vehicles travelable along the path, the system including an electronic circuit configured to control at least a speed of the vehicle, the vehicle including a position detection device, a data exchange implementable between one of (a) a vehicle and (b) a plurality of vehicles and at least one stationary unit, comprising: loading a table into the electronic circuit of the vehicle at least during an initial operation; repeating at time intervals: i) detecting information concerning a position of the vehicle and forwarding the detected information to the electronic circuit; ii) determining, using the table, a particular path section in which the vehicle is located in accordance with the detected information; iii) receiving a message from a stationary unit, the message including message portions that are assigned to particular path sections; iv) executing instructions included in the message portion that is assigned to the particular path section; v) storing a particular message portion assigned to an adjacent path section; vi) repeatedly detecting the information concerning the position and forwarding the detected information to the electronic circuit; vii) determining, using the table, a particular path section in which the vehicle is located in accordance with the detected information; viii) if the adjacent path section has been reached, implementing information assigned to the adjacent path section; ix) repeating steps iii) to ix) multiple times.

2. The method according to claim 1, wherein the adjacent path section corresponds to a path section that is to be reached next according to an advance calculation.

3. The method according to claim 1, wherein the position detection device is configured to at least one of (a) detect and (b) read codes affixed along the path and is connected to the electronic circuit.

4. The method according to claim 1, wherein the data exchange between the vehicles and the stationary unit is at least partially implemented contactlessly.

5. The method according to claim 1, wherein the vehicles are configured to exchange data between each other.

6. An automated guided transport system, comprising: at least one path having path sections; and at least one vehicle travelable along the path and suppliable with energy and information in a contactless manner, the vehicle including a position-detection device, the vehicle including an electronic circuit configured to control at least a speed of the vehicle, a data exchange implementable between one of (a) the vehicle and (b) a plurality of vehicles and at least one stationary unit; wherein the system is configured to perform a first method including: loading a table into the electronic circuit of the vehicle at least during an initial operation; repeating at time intervals: i) detecting information concerning a position of the vehicle and forwarding the detected information to the electronic circuit; ii) determining, using the table, a particular path section in which the vehicle is located in accordance with the detected information; iii) receiving a message from a stationary unit, the message including message portions that are assigned to particular path sections; iv) executing instructions included in the message portion that is assigned to the particular path section; v) storing a particular message portion assigned to an adjacent path section; vi) repeatedly detecting the information concerning the position and forwarding the detected information to the electronic circuit; vii) determining, using the table, a particular path section in which the vehicle is located in accordance with the detected information; viii) if the adjacent path section has been reached, implementing information assigned to the adjacent path section; ix) repeating steps iii) to ix) multiple times.

7. The system according to claim 6, wherein the system is at least one of (a) rail-bound, (b) rail-less, (c) arranged as an electric suspended conveyor, (d) arranged as a push skid system, and (e) arranged as a mobile assembly platform.

8. The system according to claim 6, wherein the stationary unit includes a path controller suppliable with data from a database of a computer network, the computer network including a display device configured to display at least one of (a) a state of the system and (b) state information.

* * * * *